United States Patent
Yan et al.

(10) Patent No.: US 12,483,948 B2
(45) Date of Patent: Nov. 25, 2025

(54) METHODS AND APPARATUSES FOR REPORTING HANDOVER RELATED INFORMATION

(71) Applicant: Lenovo (Beijing) Limited, Beijing (CN)

(72) Inventors: Le Yan, Shanghai (CN); Mingzeng Dai, Shanghai (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 327 days.

(21) Appl. No.: 18/270,986

(22) PCT Filed: Jan. 5, 2021

(86) PCT No.: PCT/CN2021/070313
§ 371 (c)(1),
(2) Date: Jul. 5, 2023

(87) PCT Pub. No.: WO2022/147651
PCT Pub. Date: Jul. 14, 2022

(65) Prior Publication Data
US 2024/0064589 A1  Feb. 22, 2024

(51) Int. Cl.
*H04W 36/00*  (2009.01)

(52) U.S. Cl.
CPC . *H04W 36/00833* (2023.05); *H04W 36/0079* (2018.08); *H04W 36/0083* (2013.01)

(58) Field of Classification Search
CPC ....... H04W 36/00833; H04W 36/0079; H04W 36/0083
See application file for complete search history.

(56) References Cited

U.S. PATENT DOCUMENTS

| 10,945,184 B2 * | 3/2021 | Cha .................... H04W 36/305 |
| 2013/0143573 A1 | 6/2013 | Basu Mallick et al. |

(Continued)

FOREIGN PATENT DOCUMENTS

| CN | 101600179 A | 12/2009 |
| CN | 102821384 A | 12/2012 |

(Continued)

OTHER PUBLICATIONS

PCT/CN2021/070313, "International Preliminary Report on Patentability", PCT Application No. PCT/CN2021/070313, Jul. 20, 2023, 5 pages.

(Continued)

*Primary Examiner* — Brian J. Gillis
(74) *Attorney, Agent, or Firm* — FIG. 1 Patents

(57) ABSTRACT

Disclosed are methods and apparatuses for reporting successful handover related information and/or failure related information by a user equipment to a base station. One embodiment of the subject application provides a method performed by a user equipment, including indicating, in an indication message, availability of successful handover related information and/or availability of failure related information, and transmitting the successful handover related information and/or the failure related information to a base station (BS) in response to reception of a request message from the BS, wherein the request message is based on the indication message.

20 Claims, 5 Drawing Sheets

(56) References Cited

U.S. PATENT DOCUMENTS

2014/0242994 A1    8/2014   Xu et al.
2022/0330118 A1* 10/2022   Kim ..................... H04W 80/02
2024/0015610 A1*   1/2024   Fang .................. H04W 36/362

FOREIGN PATENT DOCUMENTS

| CN | 107567059 A | 1/2018 |
|----|-------------|--------|
| WO | 2013154387 A1 | 10/2013 |
| WO | 2020197480 A1 | 10/2020 |

OTHER PUBLICATIONS

PCT/CN2021/070313, "International Search Report and Written Opinion", PCT Application No. PCT/CN2021/070313, Jul. 23, 2021, 6 pages.
21916709.5, "Extended European Search Report", EP Application No. 21916709.5, Aug. 9, 2024, 24 pages.
Ericsson, "Successful handover report in NR", 3GPP TSG-RAN WG2 #108, Tdoc R2-1915435, Reno, USA, Nov. 2019, 18 pages.

* cited by examiner

100

110 — indicating availability of successful handover related information and/or availability of failure related information in an indication message

120 — transmitting the successful handover related information and/or the failure related information in response to receiving a request message from the BS

210 — indicating at least availability of successful handover related information in an indication message and starting timer 1

220 — in response to that a request message for obtaining at least the successful handover related information is received before timer 1 expires, transmitting at least the successful handover related information

230 — removing or clearing the successful handover related information if the request message is not received when timer 1 expires

Figure 2

METHODS AND APPARATUSES FOR REPORTING HANDOVER RELATED INFORMATION

TECHNICAL FIELD

The present disclosure relates to methods and apparatuses for reporting handover related information.

BACKGROUND OF THE INVENTION

A user equipment (UE) may collect information associated with a successful handover including a set of measurements collected during the handover phase, i.e. measurement at the handover trigger, measurement at the end of handover execution, or measurement after handover execution. Herein, the successful handover refers to the UE state, namely the successful completion of a random access (RA) procedure towards the target cell. The UE could be configured with triggering conditions to collect the successful handover related information, e.g. triggering conditions for collecting the successful handover related information can be that RA procedure towards the target cell is successful; hence, the successful handover related information would be triggered only if the conditions are met.

A UE may detect connection failures (e.g., radio link failures) that occur due to too early or too late handovers, or handover to wrong cell, and collect radio link failure related information which may include e.g., time elapsed since the last handover initialization until the radio resource control (RRC) connection failure, time elapsed from the RRC connection failure till failure related information signaling, the handover type, RACH related information, etc.

After a failure, e.g., a radio link failure or a handover failure, the UE will perform re-establishment in a cell. The UE will store failure related information including information related with radio link failures and/or information related with handover failure. The UE stores the latest failure related information until the failure related information is fetched by the network or for 48 hours after the connection failure is detected. For analysis of connection failures, the UE makes the failure related information available to the network. The availability of the failure related information may be indicated by the RRCRe-establishmentComplete message, e.g. if the UE has available failure related information (e.g., VarRLF-Report), it may include rlf-InfoAvailable in the RRCRe-establishmentComplete message.

SUMMARY

In some embodiments, a method performed by a UE includes indicating, in an indication message, availability of successful handover related information and/or availability of failure related information, and transmitting the successful handover related information and/or the failure related information to a base station (BS) in response to reception of a request message from the BS, wherein the request message is based on the indication message.

In some embodiments, indicating the availability of the successful handover related information further includes including a first availability indication in the indication message, and indicating the availability of the failure related information further includes including a second availability indication in the indication message.

In some embodiments, transmitting the successful handover related information and/or the failure related information further includes transmitting the successful handover related information in a first message in response to that the successful handover related information is available and is requested to be obtained by the BS, and/or transmitting the failure related information in a second message in response to that the failure related information is available and is requested to be obtained by the BS, wherein the first message and the second message are independent or the same one.

In some embodiments, the method further includes starting a first timer after transmitting the indication message in response to that the indication message at least indicates the availability of the successful handover related information, and, in response to that the successful handover related information is not yet requested by the BS when the first timer expires, removing or clearing the successful handover related information.

In some embodiments, the method further includes starting a second timer after transmitting the indication message in response to that the indication message at least indicates the availability of the failure related information, and, in response to that the failure related information is not yet requested by the BS when the second timer expires, removing or clearing the failure related information.

In some embodiments, the method further includes comparing a time period between a successful handover and a radio link failure in a target cell with a threshold, and indicating only the availability of the failure related information in the indication message in response to that the time period is less than or equal to the threshold.

In some embodiments, the method further includes removing or clearing the successful handover related information in response to that the time period is less than or equal to the threshold.

In some embodiments, the indication message is an RRC re-establishment complete message, and the method further includes removing the successful handover related information or clearing the successful handover related information after transmitting the RRC re-establishment complete message, or an RRC re-establishment request message, or a UE information response message, or after receiving a UE information request message.

In some embodiments, the method further includes indicating only the availability of the failure related information in the indication message in response to that the failure related information is available.

In some embodiments, the indication message is an RRC re-establishment complete message.

In some embodiments, the method includes determining to obtain successful handover related information and/or failure related information based on an indication message received from a UE, and sending a request message to the UE, wherein the indication message indicates availability of the successful handover related information and/or availability of the failure related information.

In some embodiments, the request message includes a first request indication for requesting the successful handover related information in response that the indication message indicates at least the availability of the successful handover related information and the BS determines to obtain at least the successful handover related information, and/or a second request indication for requesting the failure related information in response to that the indication message indicates at least the availability of the failure related information and the BS determines to obtain at least the failure related information.

In some embodiments, the method further includes starting a first timer in response to that the indication message is received and the indication message indicates at least the availability of the successful handover related information, and sending the request message further includes sending the request message for obtaining at least the successful handover related information before the first timer expires.

In some embodiments, the method further includes starting a second timer in response to that the indication message is received and the indication message indicates at least the availability of the failure related information, and sending the request message further includes sending the request message for obtaining at least the failure related information before the second timer expires In some embodiments, an apparatus includes a non-transitory computer-readable medium having stored thereon computer-executable instructions, a receiving circuitry, a transmitting circuitry, and a processor coupled to the non-transitory computer-readable medium, the receiving circuitry and the transmitting circuitry, and the computer-executable instructions cause the processor to implement various methods according embodiments of the present application.

BRIEF DESCRIPTION OF THE DRAWINGS

Some example embodiments will now be described, by way of non-limiting examples, with reference to the accompanying drawings.

FIG. 1 illustrates an exemplary method according to some embodiments of the present disclosure.

FIG. 2 illustrates an exemplary method according to some embodiments of the present disclosure.

DETAILED DESCRIPTION

Figure 3:
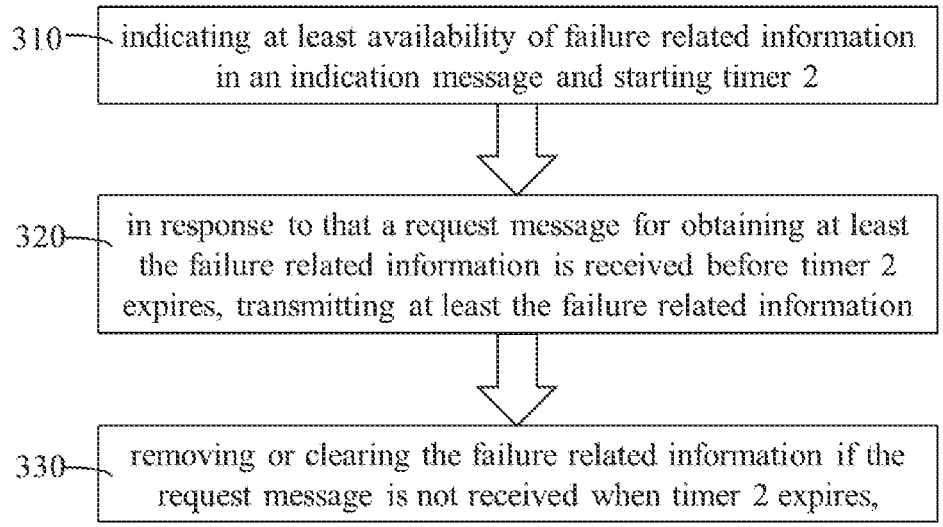
FIG. 3 illustrates an exemplary method according to some embodiments of the present disclosure.

The detailed description of the appended drawings is intended as a description of the preferred embodiments of the present invention and is not intended to represent the only form in which the present invention may be practiced. It should be understood that the same or equivalent functions may be accomplished by different embodiments that are intended to be encompassed within the spirit and scope of the present invention.

Reference will now be made in detail to some methods, embodiments, and apparatuses of the present disclosure, examples of which are illustrated in the accompanying drawings. To facilitate understanding, these methods, embodiments, and apparatuses are provided under specific network architecture and new service scenarios, such as 3GPP 5G and so on. It is contemplated that along with developments of network architectures and new service scenarios, all embodiments in the present application are also applicable to similar technical problems, and moreover, the terminologies recited in the present application may change, which should not affect the principle of the present application.

The present disclosure relates to requesting (from a network or a BS), and/or transmitting (from a UE) the successful handover related information and/or failure related information which is available at the UE side.

Upon reception of the successful handover related information, the receiving node is able to analyze whether its mobility configuration needs adjustment. Such adjustments may result in changes of mobility configurations, such as changes of mobility triggering threshold. In addition, the target radio access network (RAN) node, in the performed handover, may further optimize the dedicated random access channel (RACH) resources based on the beam measurements reported upon successful handovers.

The network may fetch the failure related information via UE information request/response mechanism, i.e., the gNB may transmit a UEinformationrequest message to the UE, and then the UE will transmit a UEinformationresponse message including the failure related information (e.g. which can be represented by the information element (IE)) VarRLF-Report to network. Network can optimize the mobility configuration based on the response message from UE. For example, an RAN node receiving the UEinformationresponse message may inform another RAN node controlling the cell where the mobility configuration caused the failure by means of the handover report procedure or the uplink RAN configuration transfer procedure. The handover report procedure or the uplink RAN configuration transfer procedure can be used to transfer the failure related information.

For example, if a radio link failure occurs in a target cell shortly after a successful handover, the UE may store successful handover related information first, and then store the failure related information, because both the triggering condition for storing successful handover related information and the triggering condition for storing failure related information are satisfied. In this case, how or what does the UE to report to the BS when both successful handover related information and failure related information are available at the UE needs to be solved.

The present disclosure provides a solution for reporting the successful handover related information and/or the failure (e.g., radio link failure) related information that is available in a UE side to the network or BS, especially in a scenario when radio link failure(s) occurs after a successful handover procedure.

FIG. 1 shows an exemplarily method 100 performed by a UE according to some embodiments of the present disclosure.

As shown in FIG. 1, the method 100 at least includes an operation 110 and/or an operation 120. The operation 110 illustrates indicating availability of successful handover related information and/or availability of failure related information in an indication message. The operation 120 illustrates transmitting the successful handover related information and/or the failure related information to a BS in response to reception of a request message from the BS. Herein, the request message from the BS is based on the indication message sent from the UE.

The BS may be one base station that manages a source cell of the handover, or one base station that manages a target cell of the handover, or one base station that manages a third cell (e.g., where the UE performs RRC re-establishment after a radio link failure). In some embodiments of the present disclosure, the BS may be referred to as an access point, an access terminal, a base, a base unit, a macro cell, a Node-B, an evolved Node B (eNB), a gNB, a Home Node-B, a relay node, or a device, or described using other terminology used in the art.

If the successful handover related information is available, the indication message contains the availability of the successful handover related information. In some embodiments, the UE may include an availability indication in the indication message for indicating that the successful handover related information is available.

If the failure related information is available, the indication message contains the availability of the failure related information. In some embodiments, the UE may include another availability indication in the indication message for indicating that that the failure related information is available.

If both the successful handover related information and the failure related information are available, the indication message contains the availability of the successful handover related information and the availability of the failure related information. In some embodiments, the UE may include an availability indication for indicating that the successful handover related information is available, and another availability indication for indicating that that the failure related information is available, in the indication message. In some embodiments, the UE may include an availability indication indicating that both the successful handover related information and the failure related information are available, in the indication message.

If the successful handover related information and the failure related information are not available, the UE does not neither indicate availability of the successful handover related information nor availability of the failure related information.

In some embodiments, if both the successful handover related information and the failure related information are available, the request message may be for obtaining the successful handover related information, the failure related information, or the both. It is up to the BS implementation.

In some embodiments, the BS does not send any request message even if the successful handover related information and/or the failure related information are available; in this case, the UE only perform the operation 110, and does not perform the operation 120.

In some embodiments, if the successful handover related information is available and the request is for obtaining at least the successful handover related information, the UE may send the successful handover related information in a first message. In some embodiments, the first message can be a UE information response message.

In some embodiments, if the failure related information is available and the request is for obtaining at least the failure related information, the UE may send the failure related information in a second message. In some embodiments, the second message can be a UE information response message.

In some embodiments, the first message and the second message are independent or the same one. In other words, the failure related information and the successful handover related information may be sent in the same message (e.g. the same message can be a UE information response message), or in different two independent messages (e.g. the different two independent messages can be two independent UE information response messages). If the failure related information and the successful handover related information are sent in two different independent messages, it means that the transmissions of these messages may be independent from each other.

In some embodiments, the method may further include starting a timer after transmitting the indication massage, and removing or clearing the corresponding available information if the available information is not yet requested by the BS when the timer expires. After a period of time, the available information may be no sense for the BS.

FIG. 2 illustrates an exemplary method 200 based on method 100.

As shown in FIG. 2, the method 200 may include three operations 210, 220, and 230. The operation 210 illustrates indicating at least availability of successful handover related information in an indication message and starting timer 1. In other words, timer 1 is started when the indication message is sent. The operation 220 illustrates in response to that a request from the BS for obtaining at least the successful handover related information is arrived at the UE before timer 1 expires, transmitting at least the successful handover related information. The operation 230 illustrates removing or clearing the successful handover related information if the request message for obtaining at least the successful handover related information is not received when timer 1 expires; in other words, if the successful handover related information is not yet requested by the BS when timer 1 expires, the UE may remove or clear the successful handover related information.

In some embodiments, timer 1 is configured by a BS that manages the target cell of the handover (e.g., via a handover command) or predefined.

FIG. 3 illustrates an exemplary method 300 based on method 100.

As shown in FIG. 3, the method 300 may include three operations 310, 320, and 330. The operation 310 illustrates indicating at least availability of failure related information in an indication message and starting timer 2. In other words, timer 2 is started when the indication message is sent. The operation 320 illustrates in response to that a request from the BS for obtaining at least the failure related information is arrived at the UE before timer 2 expires, transmitting at least the failure related information. The operation 330 illustrates removing or clearing the failure related information if the request message for obtaining at least the failure related information is not received when timer 2 expires; in other words, if the failure related information is not yet requested by the BS when timer 2 expires, the UE may remove or clear the failure related information.

In some embodiments, timer 2 is configured by a BS that manages the target cell of the handover (e.g., via a handover command) or predefined.

In some embodiments, timer 1 and timer 2 are independent or the same one.

In some embodiments, the transmission of the failure related information and the transmission of the successful handover related information are independent.

In some embodiments, if the indication message indicates both the availability of failure related information and the availability of the successful handover related information, timer 1 and timer 2 may be started simultaneously.

Figure 4:
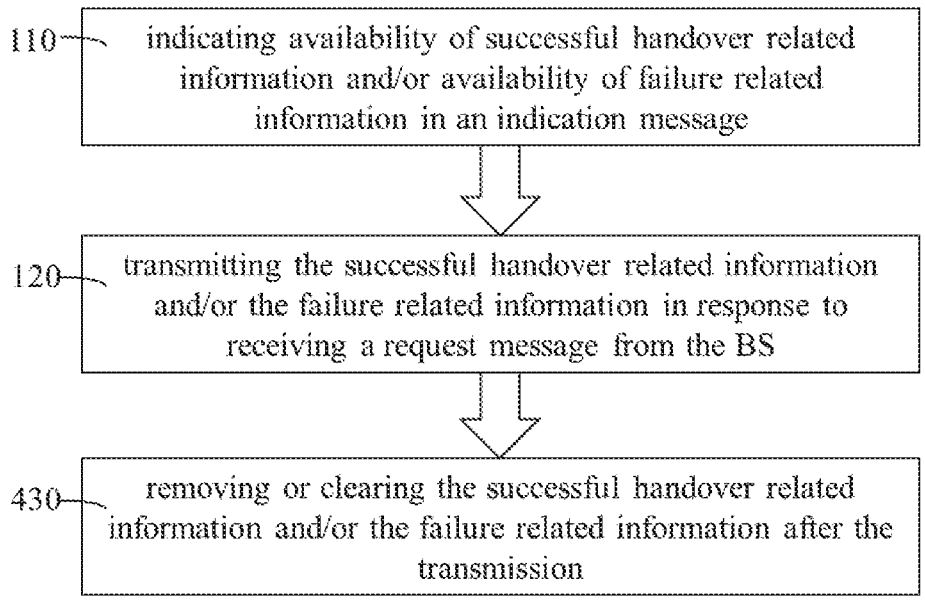
FIG. 4 illustrates an exemplary method according to some embodiments of the present disclosure.

FIG. 4 illustrates an exemplary method 400 based on method 100 according to some embodiments of the present disclosure.

As shown in FIG. 4, besides the operations 110 and 120, the method 400 may further includes the operation 430 of removing or clearing the successful handover related information and/or the failure related information after transmission of the successful handover related information and/or the failure related information.

For example, the UE may remove or clear the successful handover related information after the transmission of the successful handover related information.

For example, the UE may remove or clear the failure related information after the transmission of the failure related information.

For example, the UE may remove or clear the successful handover related information and the failure related information after transmission of the successful handover related information and the failure related information.

In some embodiments, if the successful handover related information or the failure related information is available yet not transmitted due to that no request is from the BS, the UE may not remove or clear this available yet not transmitted information.

In some embodiments, if the successful handover related information or the failure related information is transmitted, the UE may remove or clear all the successful handover related information (if existed) and the failure related information (if existed).

Figure 5:
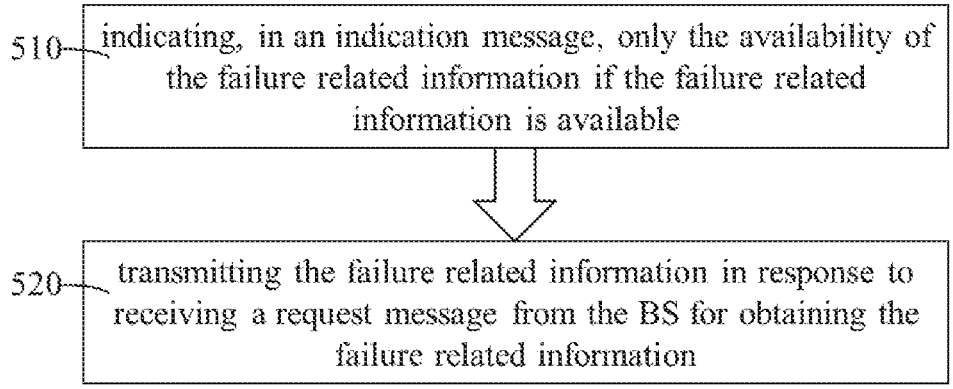
FIG. 5 illustrates an exemplary method according to some embodiments of the present disclosure.

FIG. 5 illustrate an exemplary method 500 based on method 100 according to some embodiments of the present disclosure.

As shown in FIG. 5, the method 500 includes two operations 510 and 520. The operation 510 illustrates indicating only the availability of the failure related information in the indication message when the failure related information is available, no matter handover is successful or successful handover related information is also available in the UE. The operation 520 illustrates transmitting the failure related information if the UE receives a request message for obtaining the failure related information.

In some embodiments, the method 500 may further incudes removing or clearing the successful handover related information stored in the UE.

In some scenarios, a radio link failure occurs in the target cell shortly after a successful handover. In such scenarios, the successful handover related information may be meaningless for the BS.

Figure 6:
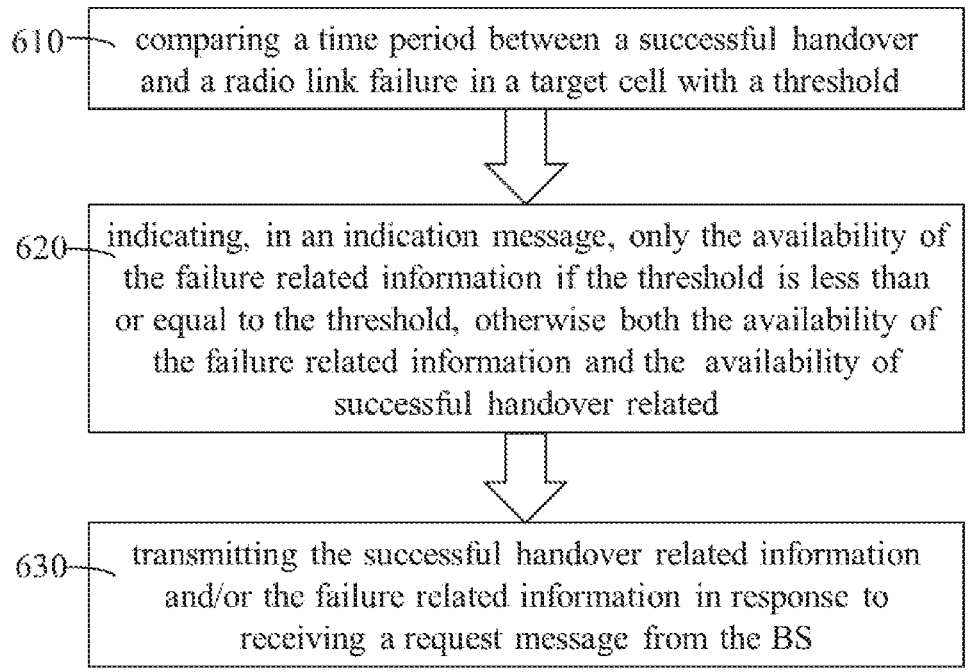
FIG. 6 illustrates an exemplary method according to some embodiments of the present disclosure.

FIG. 6 illustrate an exemplary method 600 based on method 100 according to some embodiments of the present disclosure, in a scenario that radio link failures occurs after a successful handover.

As shown in FIG. 6, the method 600 includes three operations 610, 620, and 630. The operation 610 illustrates comparing a time period between a successful handover and a radio link failure in a target cell with a threshold. The operation 620 illustrates indicating only the availability of the failure related information in the indication message if the time period is less than or equal to the threshold, or indicating both the availability of the failure related information and the availability of the successful handover related information if the time threshold is greater than the threshold. The operation 630 illustrates transmitting the failure related information, or transmitting the successful handover related information and the failure related information, or transmitting the successful handover related information, in response to reception of a request message from the BS. Herein, the request message is based on the indication message.

In some embodiments, the threshold is configured by a BS that manages the target cell of the handover. For example, the threshold is included in the handover command (i.e., the RRC reconfiguration message including ReconfigurationWithSync information element). In some embodiments, the threshold is predefined.

In some embodiments, the method 600 may further includes removing or clearing the successful handover related information if the time period between the successful handover and the radio link failure is less than or equal to the threshold.

According to the aforementioned various methods and implementations, in some embodiments, the indication message maybe an RRC re-establishment complete message (e.g., RRCRe-establishmentComplete). The UE indicates the availability (e.g., IE successfulho-InfoAvailable) of the successful handover related information and/or the availability (e.g., IE rlf-InfoAvailable) of the failure related information in the RRC re-establishment complete message.

According to the aforementioned various methods and implementations, in some embodiments, the request message may be a UE information request message, and the UE may transmit the requested available information in a UE information response message.

Figure 7:
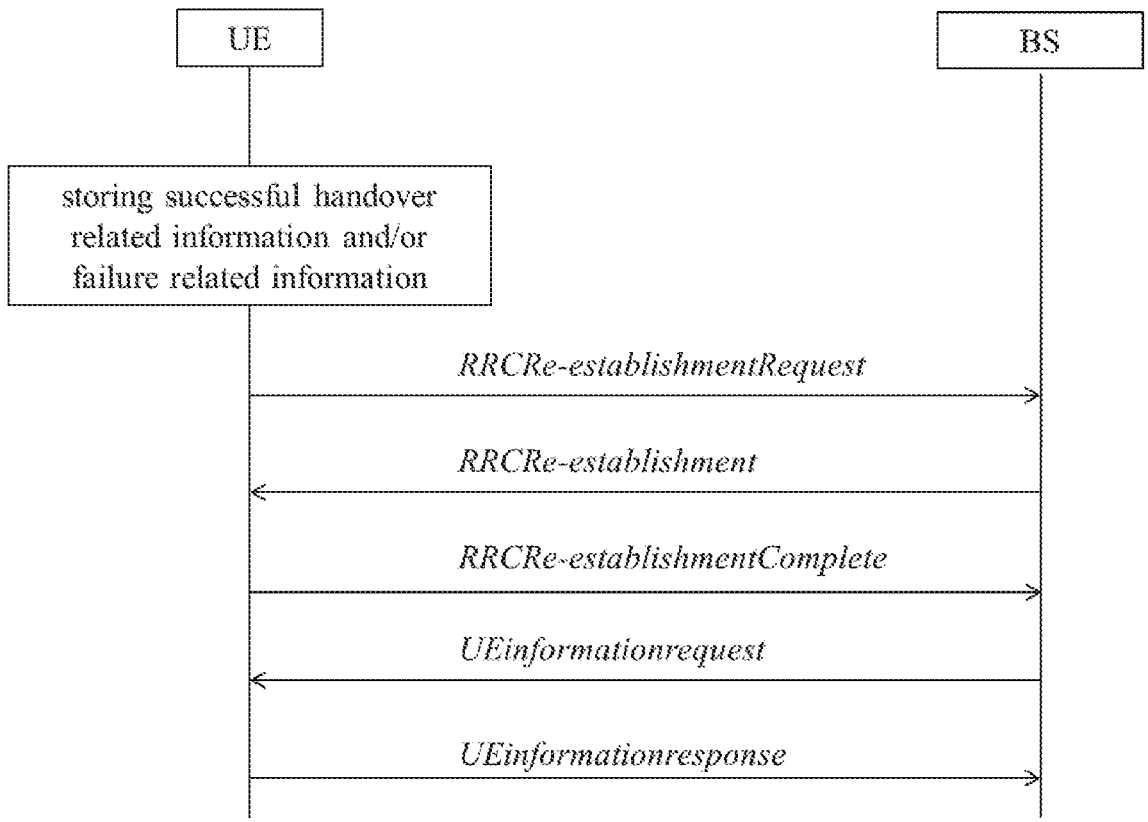
FIG. 7 illustrates an exemplary signaling flow according to some embodiments of the present disclosure.

FIG. 7 illustrates an exemplary signaling sequence about reporting the successful handover related information and/or the failure (e.g., radio link failure) related information that is available in a UE side to the network or BS according to some embodiments of method 100.

In a scenario that a radio link failure occurs in the target cell shortly after successful handover, the UE may store the radio link failure related information and/or successful handover (e.g., occurs before the radio link failure) related information. Then the UE may perform RRC re-establishment in a cell (source cell, target cell, or a third cell), including the following steps: the UE sends an RRC re-establishment request message (e.g., RRCRe-establishmentRequest) to the BS, receives an RRC re-establishment message (e.g., RRCRe-establishment) from the BS later, and sends an RRC re-establishment complete message (e.g., RRCRe-establishmentComplete) to the BS if the RRC re-establishment is completed. For analysis of the failure related information and/or the successful handover related information, the UE may indicate the availability of the successful handover related information and/or the failure related information to the BS via the RRC re-establishment complete message. If the BS determines to obtain the radio link failure related information and/or the successful handover related information based on the RRC re-establishment complete message, the BS sends a request for obtaining the information via a UE information request message (e.g., UEinformationrequest). In response to reception of the UE information request message which includes the request for obtaining the successful handover related information and/or the failure related information, the UE may send the information to be requested via a UE information response message (e.g., UEinformationresponse) to the BS. The BS therefore is able to optimize the mobility problem based on the information shared by the UE.

In the aforementioned various methods and implementations, removing or clearing the successful handover related information includes removing the successful handover related information or clearing the successful handover related information after transmitting an RRC re-establishment complete message, or an RRC re-establishment request message, or a UE information response message, or after receiving a UE information request message.

In the network side, a BS or network may execute corresponding methods to various methods performed by the UE for determining and requesting information based on the indication message sent from the UE, herein the indication message indicates the availability of the successful handover related information and/or the availability of the failure related information.

In some embodiments of the present disclosure, the BS may be referred to as an access point, an access terminal, a base, a base unit, a macro cell, a Node-B, an evolved Node B (eNB), a gNB, a Home Node-B, a relay node, or a device, or described using other terminology used in the art.

Figure 8:
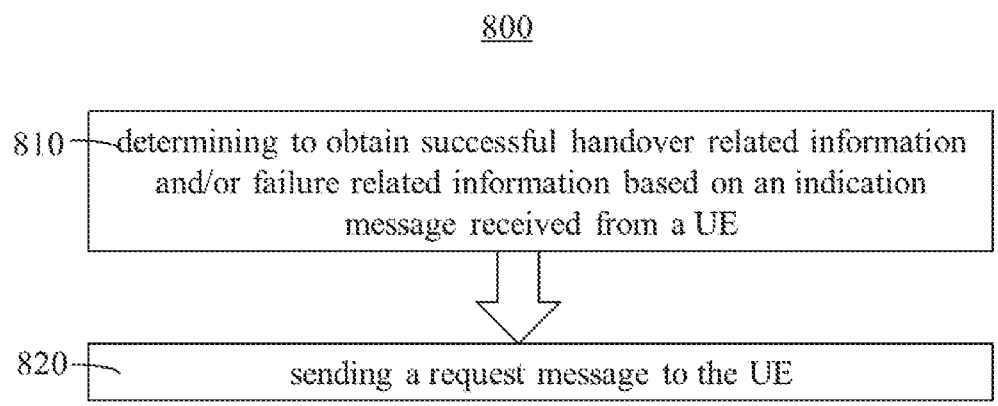
FIG. 8 illustrates an exemplary method according to some embodiments of the present disclosure.

FIG. 8 illustrates an exemplary method 800 performed by a BS according to the method 100 performed by a UE.

As shown in FIG. 8, the method 800 includes two operations 810 and 820. The operation 810 illustrates determining to obtain successful handover related information and/or failure related information that is available based on an indication message received from a UE. The operation 820 illustrates sending a request message to the UE. Herein, the indication message indicates availability of the successful handover related information and/or availability of the failure related information.

In some embodiments, the BS does not need any information even if the successful handover related information and/or the failure related information is available; accordingly, the BS does not perform operation 820.

In some embodiments, the BS may need the successful handover related information, the failure related information, or the both if both of the successful handover related information, the failure related information are available. It is up to the BS implementation.

In some embodiments, in the operation 820, the request message may include a request indication for requesting the successful handover related information in response that the indication message received from the UE indicates at least the availability of the successful handover related information and the BS determines to obtain at least the successful handover related information.

In some embodiments, in operation 820, the request message may include another request indication for requesting the failure related information in response to that the indication message indicates at least the availability of the failure related information and the BS determines to obtain at least the failure related information.

In some embodiments, in operation 820, the request message may include a request indication for requesting the successful handover related information and another request indication for requesting the failure related information in response to that the indication message indicates both the successful handover related information and the failure related information are available, and the BS determines to obtain the successful handover related information and the failure related information. In some embodiments, in the operation 820, the request message may include a request indication for requesting the successful handover related information and the failure related information in response to that the indication message indicates both the successful handover related information and the failure related information are available, and the BS determines to obtain the successful handover related information and the failure related information.

In some embodiments, the indication message received from the UE may include an availability indication in the indication message for indicating that the successful handover related information is available. In some embodiments, the indication message received from the UE may include an availability indication in the indication message for indicating that the failure related information is available. In some embodiments, the indication message received from the UE may include an availability indication in the indication message for indicating that the successful handover related information is available, and another availability indication in the indication message for indicating that the failure related information is available. In some embodiments, the indication message received from the UE may include an availability indication indicating that both the successful handover related information and the failure related information are available.

In some embodiments, the method 800 further includes starting timer 3 in response to that the indication message is received and the indication message indicates at least the availability of the successful handover related information, and in the operation 820, the BS sends the request message for obtaining at least the successful handover related information before timer 3 expires if the BS determines to obtain at least the successful handover related information. In some embodiments, the BS does not send the request message for obtaining at least the successful handover related information when timer 3 expires.

In some embodiments, the method 800 further includes starting timer 4 in response to that the indication message is received and the indication message indicates at least the availability of the failure related information, and in the operation 820, the BS sends the request message for obtaining at least the failure related information before timer 4 expires if the BS determines to obtain at least the failure related information. In some embodiments, the BS does not send the request message for obtaining at least the failure related information when timer 4 expires.

In some embodiments, similarly as timer 1 and timer 2, timer 3 and/or timer 4 can be configured by the BS which configured timer 1 and/or timer 2 as mentioned above or predefined.

In some embodiments, timer 3 corresponds to timer 1; and timer 4 corresponds to timer 2.

The present disclosure provides a solution for a UE to share the successful handover related information and/or the failure related information with a BS, for example, in a scenario when a radio link failure occurs in the target cell shortly after a successful handover. This enhances the measurement report original function of the whole system or network, provides more robust mobility via reporting failure events observed before, during, or after successful handovers. The present disclosure has many advantages, for example, it is helpful for the system or network to adjust mobility configurations, mobility thresholds, radio link management (RLM) configurations, and etc., and to further optimize dedicated RACH resources.

The spirit of the present disclosure is not limited to the various embodiments, examples, and methods mentioned previously. On the basis of not violating the inventive spirit of the present invention, the above various embodiments in the present invention can be reasonably extended or combined together.

For example, in some embodiments, if a radio link failure occurs in the target cell shortly after successful handover, the UE only indicates the availability of the failure related information to the BS, no matter there is a successful handover occurring before the failure or successful handover related information is available in the UE side. The failure related information is removed or cleared after the transmission of the radio link failure related information.

For example, the UE may indicate the availability of the successful handover related information and the availability of the failure related information in independent messages or in the same message. In other words, the UE may include an availability indication indicating that the successful handover related information is available, and another availability indication indicating that the failure related information is available, in different independent messages or in the same message. For example, the availability of the failure related information may be included in an RRC re-establishment complete message, and the availability of the successful handover related information may be included in an RRC re-establishment request message or the RRC re-establishment complete message or an RRC reconfiguration complete message.

For example, the BS may send the request for the successful handover related information and the request for the failure related information in independent request messages or in the same request message. In other words, the BS may include a request indication for the failure related information and another request indication for the successful handover related information in different independent messages or in the same message. For example, the BS may include the request indication for the failure related information in a UE information request message, and may include the request indication for the successful handover related information in an RRC re-establishment message or the UE information request message.

For example, the UE may include an availability indication indicating that both the successful handover related information and the failure related information are available, and the BS may identify this availability indication.

For example, if both the successful handover related information and the failure related information are available, and the BS determines to obtain these two kinds of information, the BS may include only one request indication for requesting both the successful handover related information and the failure related information in the request message, and the UE may identify this request indication.

For example, the BS may request at least part of the successful handover related information and/or at least part of the failure related information.

Figure 9:
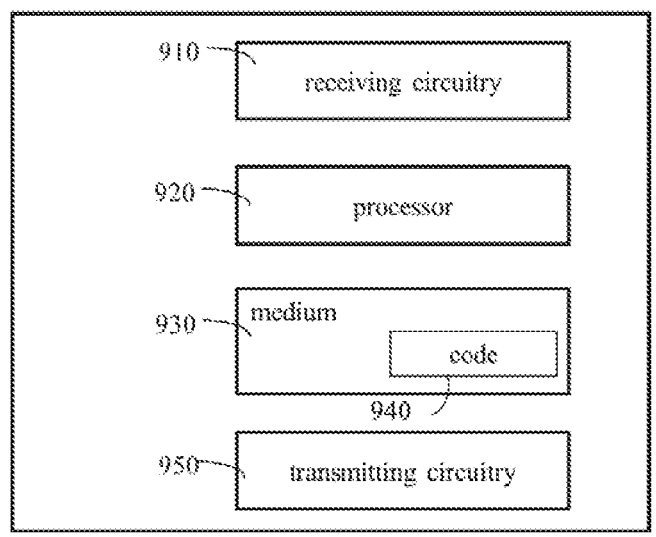
FIG. 9 illustrates an example apparatus according to some embodiments of the present disclosure.

For example, the failure is not limited to radio link failures, it may include other failures and the information collected during these failures are helpful for the BS to adjust mobility configurations, mobility thresholds, RLM configurations, and etc., and to further optimize dedicated RACH resources, FIG. 9 illustrates an example apparatus 900 for performing the method 100, which, for example, may be at least a part of a UE.

As shown in FIG. 9, the apparatus 900 may include at least one receiving circuitry 910, at least one processor 920, at least one non-transitory computer-readable medium 930 with computer-executable 940 stored thereon, and at least one transmitting circuitry 950. The at least one medium 930 and the computer program code 940 may be configured to, with the at least one processor 920, cause the apparatus 900 at least to perform at least the example method 100 described above, wherein, for example, the apparatus 900 may be the UE in the example method 100.

Figure 10:
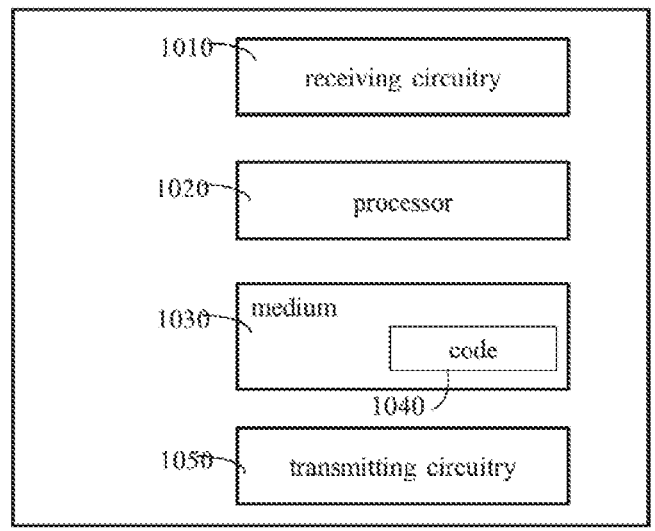
FIG. 10 illustrates an example apparatus according to some embodiments of the present disclosure.

FIG. 10 illustrates an example apparatus 1000 for performing the method 800, which, for example, may be at least a part of a UE.

As shown in FIG. 10, the apparatus 1000 may include at least one receiving circuitry 1010, at least one processor 1020, at least one non-transitory computer-readable medium 1030 with computer-executable 940 stored thereon, and at least one transmitting circuitry 1050. The at least one medium 1030 and the computer program code 1040 may be configured to, with the at least one processor 1020, cause the apparatus 1000 at least to perform at least the example method 800 described above, wherein, for example, the apparatus 1000 may be the UE in the example method 800.

In various example embodiments, the at least one processor 920 or 1020 may include, but not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, the at least one processor 920 or 1020 may also include at least one other circuitry or element not shown in FIG. 9 or FIG. 10.

In various example embodiments, the at least one medium 930 or 1030 may include at least one storage medium in various forms, such as a volatile memory and/or a non-volatile memory. The volatile memory may include, but not limited to, for example, an RAM, a cache, and so on. The non-volatile memory may include, but not limited to, for example, an ROM, a hard disk, a flash memory, and so on. Further, the at least medium 930 or 1030 may include, but are not limited to, an electric, a magnetic, an optical, an electromagnetic, an infrared, or a semiconductor system, apparatus, or device or any combination of the above.

Further, in various example embodiments, the example apparatus 900 or 1000 may also include at least one other circuitry, element, and interface, for example antenna element, and the like.

In various example embodiments, the circuitries, parts, elements, and interfaces in the example apparatus 900 or 1000, including the at least one processor 920 or 1020 and the at least one medium 930 or 1030, may be coupled together via any suitable connections including, but not limited to, buses, crossbars, wiring and/or wireless lines, in any suitable ways, for example electrically, magnetically, optically, electromagnetically, and the like.

The methods of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. An apparatus, comprising:
   a memory; and
   a processor coupled to the memory, the processor configured to cause the apparatus to:
      indicate, in an indication message, one or more of availability of successful handover related information or availability of failure related information; and
      transmit one or more of the successful handover related information or the failure related information to a base station (BS) in response to reception of a request message from the BS,
      wherein the request message is based on the indication message.

2. The apparatus of claim 1, wherein the processor is configured to cause the apparatus to:
   indicate the availability of the successful handover related information via a first availability indication in the indication message; and
   indicate the availability of the failure related information via a second availability indication in the indication message.

3. The apparatus of claim 1, wherein to transmit the one or more of the successful handover related information or the failure related information, the processor is configured to cause the apparatus to one or more of:
   transmit the successful handover related information in a first message in response to that the successful handover related information is available and is requested to be obtained by the BS; or
   transmit the failure related information in a second message in response to that the failure related information is available and is requested to be obtained by the BS,
   wherein the first message and the second message comprise one of an independent message or a same message.

4. The apparatus of claim 1, wherein the processor is configured to cause the apparatus to:
   start a first timer after transmitting the indication message in response to that the indication message at least indicates the availability of the successful handover related information; and
   in response to that the successful handover related information is not yet requested by the BS when the first timer expires, one or more of remove or clear the successful handover related information.

5. The apparatus of claim 1, wherein the processor is configured to cause the apparatus to:
   start a second timer after transmitting the indication message in response to that the indication message at least indicates the availability of the failure related information; and
   in response to that the failure related information is not yet requested by the BS when the second timer expires, one or more of remove or clear the failure related information.

6. The apparatus of claim 1, wherein the processor is configured to cause the apparatus to:
   compare a time period between a successful handover and a radio link failure in a target cell with a threshold; and
   indicate only the availability of the failure related information in the indication message in response to that the time period is less than or equal to the threshold.

7. The apparatus of claim 6, wherein the processor is configured to cause the apparatus to one or more of remove or clear the successful handover related information in response to that the time period is less than or equal to the threshold.

8. The apparatus of claim 7, wherein the indication message is a radio resource control (RRC) re-establishment complete message, and the processor is configured to cause the apparatus to:
   one or more of remove the successful handover related information or clear the successful handover related information after one or more of transmitting the RRC re-establishment complete message, transmitting an RRC re-establishment request message, transmitting a UE information response message, or after receiving a user equipment (UE) information request message.

9. The apparatus of claim 1 wherein the processor is configured to cause the apparatus to indicate only the availability of the failure related information in the indication message in response to that the failure related information is available.

10. The apparatus of claim 1, wherein the indication message is comprises a radio resource control (RRC) re-establishment complete message.

11. An apparatus, comprising:
    a memory; and
    a processor coupled to the memory, the processor configured to cause the apparatus to:
       determine, at a base station (BS), to obtain one or more of successful handover related information or failure related information based on an indication message received from a user equipment (UE); and
       send a request message to the UE,
       wherein the indication message indicates availability of the one or more of the successful handover related information or availability of the failure related information.

12. The apparatus of claim 11, wherein the request message includes one or more of:
    a first request indication for requesting the successful handover related information in response that the indication message indicates at least the availability of the successful handover related information and the BS determines to obtain at least the successful handover related information; or
    a second request indication for requesting the failure related information in response to that the indication message indicates at least the availability of the failure related information and the BS determines to obtain at least the failure related information.

13. The apparatus of claim 11, wherein the processor is configured to cause the apparatus to:
    start a first timer in response to that the indication message is received and the indication message indicates at least the availability of the successful handover related information; and
    send the request message further comprises sending the request message for obtaining at least the successful handover related information before the first timer expires.

14. The apparatus of claim 11, wherein the processor is configured to cause the apparatus to:

start a second timer in response to that the indication message is received and the indication message indicates at least the availability of the failure related information; and send the request message further comprises sending the request message for obtaining at least the failure related information before the second timer expires.

15. A method, comprising:

indicating, in an indication message, availability of one or more of successful handover related information or availability of failure related information; and transmitting the one or more of the successful handover related information or the failure related information to a base station (BS) in response to reception of a request message from the BS, wherein the request message is based on the indication message.

16. The method of claim 15, wherein:

indicating the availability of the successful handover related information further comprises including a first availability indication in the indication message; and indicating the availability of the failure related information further comprises including a second availability indication in the indication message.

17. The method of claim 15, wherein transmitting the one or more of the successful handover related information or the failure related information further comprises one or more of:

transmitting the successful handover related information in a first message in response to that the successful handover related information is available and is requested to be obtained by the BS; or transmitting the failure related information in a second message in response to that the failure related information is available and is requested to be obtained by the BS, wherein the first message and the second message comprise one of an independent message or a same message.

18. The method of claim 15, further comprising:

starting a first timer after transmitting the indication message in response to that the indication message at least indicates the availability of the successful handover related information; and in response to that the successful handover related information is not yet requested by the BS when the first timer expires, one or more of removing or clearing the successful handover related information.

19. The method of claim 15, further comprising:

starting a second timer after transmitting the indication message in response to that the indication message at least indicates the availability of the failure related information; and in response to that the failure related information is not yet requested by the BS when the second timer expires, one or more of removing or clearing the failure related information.

20. The method of claim 15, further comprising:

comparing a time period between a successful handover and a radio link failure in a target cell with a threshold; and indicating only the availability of the failure related information in the indication message in response to that the time period is less than or equal to the threshold.

* * * * *